United States Patent [19]

Smith

[11] Patent Number: 4,523,669
[45] Date of Patent: Jun. 18, 1985

[54] RETRACTABLE CONVEYOR BELT

[76] Inventor: Donald L. Smith, 14865 - 103 Ave., Surrey, British Columbia, Canada, V3R 1L4

[21] Appl. No.: 366,145

[22] Filed: Apr. 7, 1982

[30] Foreign Application Priority Data

Apr. 9, 1981 [CA] Canada ................................. 375148

[51] Int. Cl.³ ............................................. B65G 15/26
[52] U.S. Cl. ..................................... 198/313; 212/231
[58] Field of Search ............... 198/313, 314, 311, 318, 198/812, 594; 414/718, 688; 212/231, 264, 267

[56] References Cited

U.S. PATENT DOCUMENTS

| | | | |
|---|---|---|---|
| 2,267,419 | 12/1941 | Oster | 198/315 X |
| 2,815,849 | 12/1957 | Zumbrennun | 198/313 X |
| 2,999,600 | 9/1961 | Gates | 212/231 |
| 3,844,418 | 10/1974 | Lamer | 414/718 X |
| 3,945,484 | 3/1976 | Oury | 198/812 X |
| 4,190,291 | 10/1979 | Oury | 198/594 X |
| 4,392,573 | 7/1983 | Gyomrey | 212/264 X |

FOREIGN PATENT DOCUMENTS 1122764  8/1968  United Kingdom ................. 212/231

Primary Examiner—Joseph E. Valenza
Assistant Examiner—Dennis Williamson
Attorney, Agent, or Firm—Frishauf, Holtz, Goodman & Woodward

[57] ABSTRACT

This invention relates to a telescopic boom and conveyor apparatus which can be vehicle mounted. An endless conveyor belt is carried by a main boom which itself is telescopic. Optionally, an articulated boom can be attached to the free end of the main boom. Separate means is provided for the support of the main and articulated boom which automatically adjusts during telescopic displacement in order to maintain the main boom and articulated boom at predetermined angles. The angulation of the booms can be changed and the conveyor run while the main boom is undergoing telescopic displacement.

16 Claims, 12 Drawing Figures

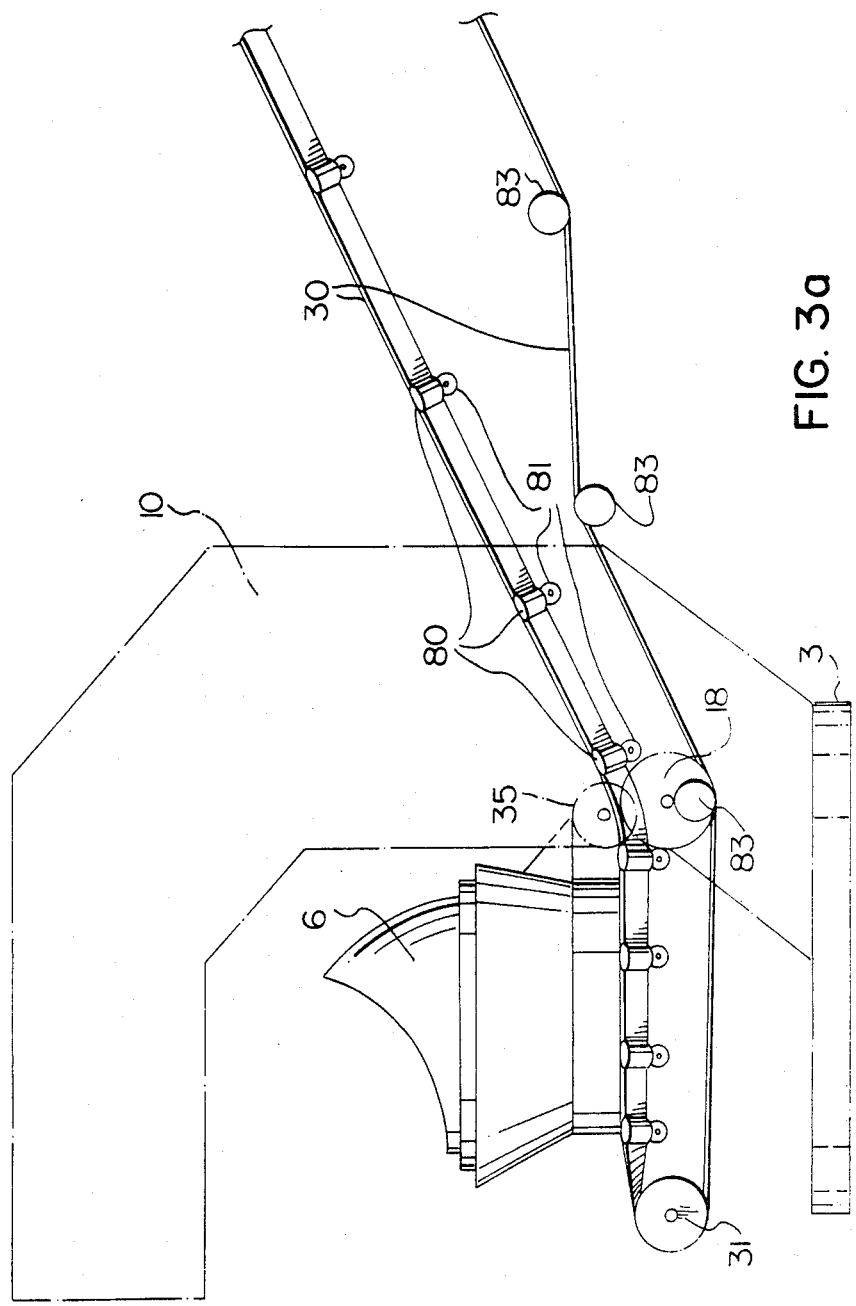

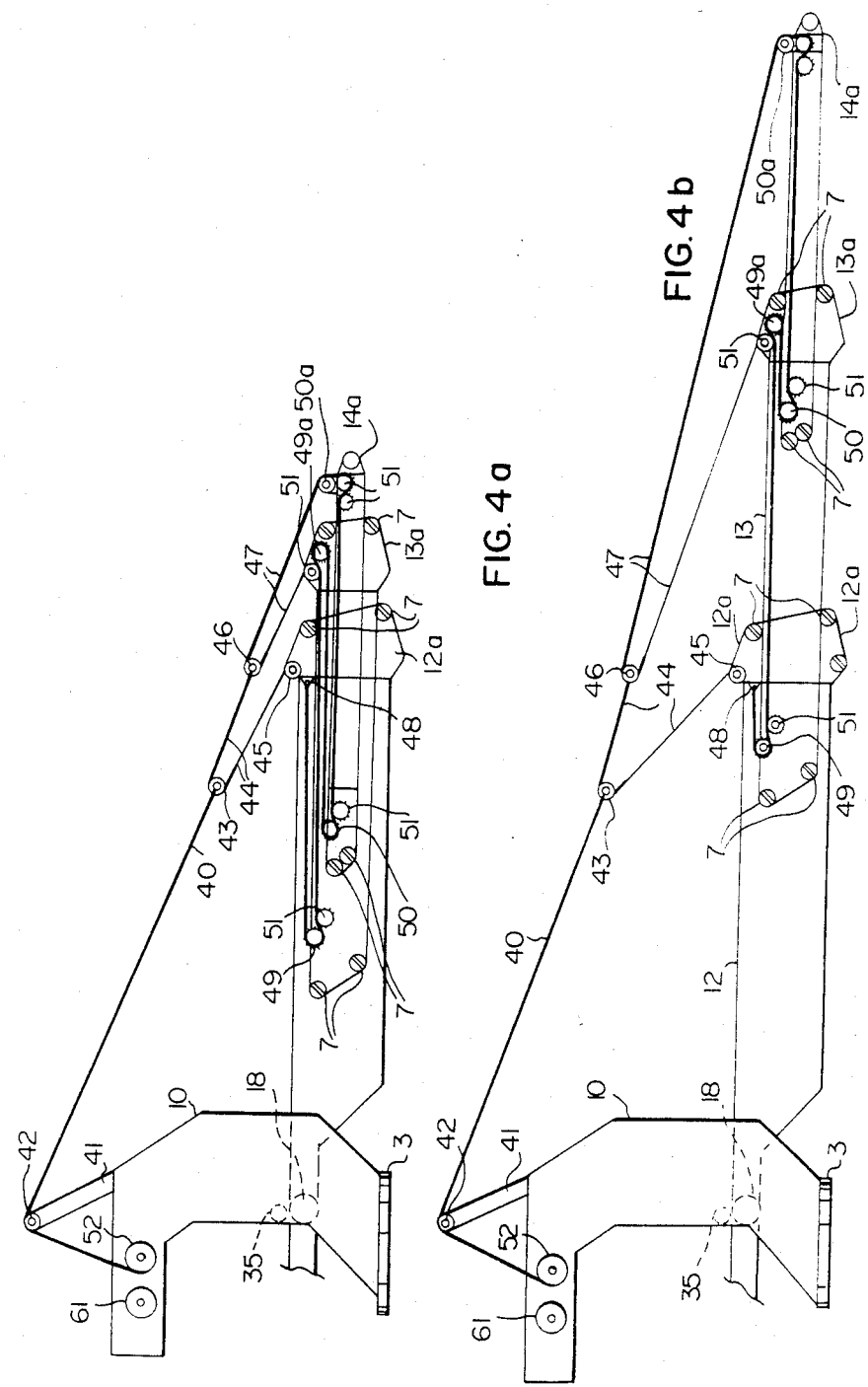

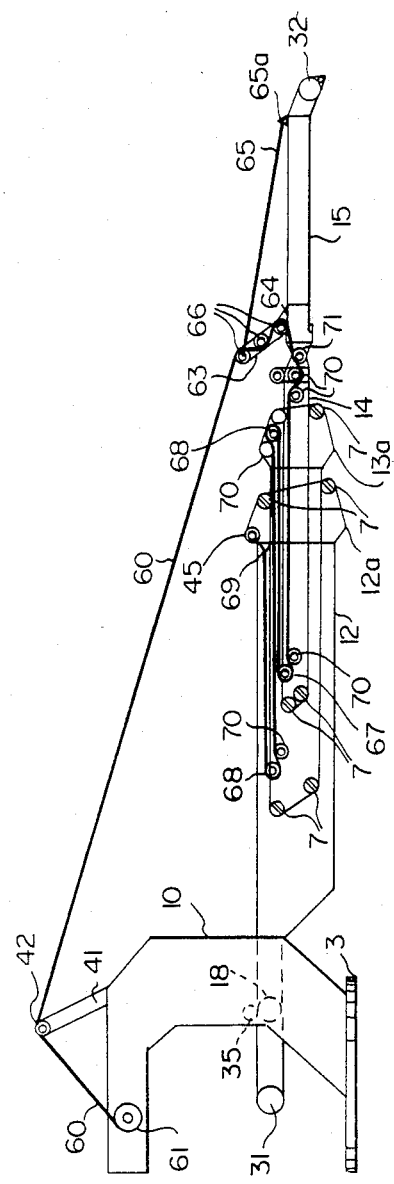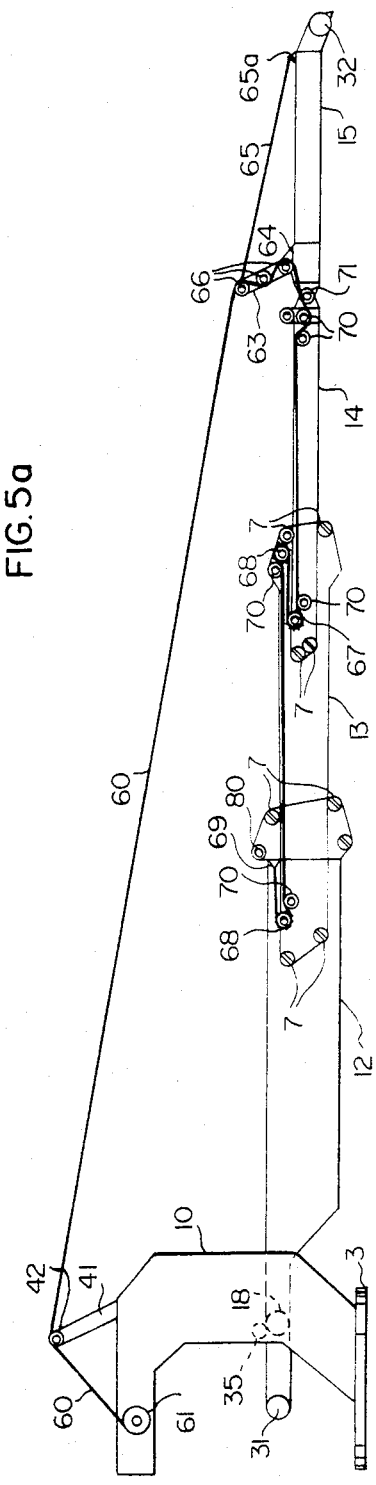

RETRACTABLE CONVEYOR BELT

BACKGROUND OF INVENTION

This invention relates to a novel telescopic boom and conveyor apparatus useful in tranporting solid or semisolid material such as concrete from a base to variable distances and heights from the base.

A conventional method for transporting concrete from a supply truck at a work site to be poured thereat during the construction of a commercial building or the like involves the use of a mobile crane and concrete bucket. The rate at which concrete can be delivered to the pour site is, in part, a function of the time necessary to charge the bucket with concrete and deliver it via the crane to the work site for discharge prior to repeating the process. Similarly, in open-pit mining, there is no convenient way to convey from the pit, material to the pit surface other than by fixed conveyer installations or shovel and truck transport.

BRIEF SUMMARY OF INVENTION

In accordance with my invention, I have devised a novel telescopic boom and conveyer apparatus which is useful in many diverse material handling operations where the material must be transported over varying distances and elevations. Furthermore, as the apparatus of my invention can be vehicle mounted, it enjoys improved versatility over known stationary material conveyors. Additionally, continuous and thus more economical delivery of conveyed material can be had utilizing my conveyor device when compared to most conventional mobile crane and bucket forms of material transport.

In accordance with this invention, my novel telescopic boom and conveyor device comprises a base component to which a main boom including first, second and third telescopic boom sections is pivotally attached for vertical movement relative thereto. Means is also provided for causing telescopic displacement of the third section within the second section and concurrently therewith, for causing the second section to displace telescopically within the first section so that these sections extend between points of minimum and maximum boom extension. The upper run of an endless conveyor belt is carried by the upper surface of the main boom and is so arranged that the upper run of the belt extends from adjacent the pivotal connection of the first section with the base to at least the free end of the third section remote from the said base. Thus, the upper run overlies the first, second and third boom sections regardless of whether the boom is in its maximum or minimum extension position. Means is also provided for driving the belt as are means for supporting the belt during its upper and return or lower runs. Because the endless belt is of a predetermined length, in order to accommodate the surplus length of the belt resulting in variations of the telescopic extent of the boom, provision is made for accommodating the excess belt length during the return or lower run of the belt by employing fixed belt take-up means on the first, second and third boom sections. Additionally, main boom support and telescopic control means is provided in order to enable the main boom to maintain a predetermined angle whilst the sections are being telescopically displaced. First hoist means is also located on the base component and cooperates with the aforesaid main boom support means and telescopic control means in order to raise or lower the main boom to any desired angle.

In another preferred embodiment of my invention, I have made provision for a fourth articulated boom or section which is pivotally connected to the free end of the third section. In this arrangement, as before, the conveyor belt overlies the main boom as well as the articulated boom. This fourth section imparts to my apparatus the ability to convey material transported on the belt an additional distance and more importantly, a distance further into the work site not otherwise conveniently reached by the free end of the third section due to an obstruction. As the articulated boom is free to move relative to the main boom, articulated boom support and telescopic displacement control means is provided for and which functions in a manner somewhat similar to the main boom support and telescopic control means. In extends from a point on the base at a position above the pivotal connection of the base with the first boom section, to the articulated boom section. This means enables the angle of the articulated boom to be adjusted independently of the angle of the main boom through the instrumentality of a second hoist means and additionally, is so designed that the degree of established angulation can be maintained during telescopic displacement of the main boom with the second hoist means in an inoperative condition.

While the apparatus of my invention may involve a stationary base for the purpose of conveying material varying distances, the base itself can advantageously be made rotatable in order to effect material delivery within any desired sector circumscribed by maximum main boom or main boom and articulated boom extension. One obvious advantage inherent in my novel construction is that the apparatus can also be vehicle mounted for mobile transport and use in a manner similar to conventional mobile cranes.

It will be apparent that while the first, second and third boom sections are telescopic, where the fourth articulated section is utilized, it does not enjoy this telescopic capability. Accordingly, in situations where the apparatus is vehicle mounted for distance road transport with the three main sections in their retracted condition, I have made provision for effectively enabling the articulated boom section to overlie the retracted three main sections for the purpose of reducing the overall four section boom length. This is achieved by the inclusion of a connecting link means intermediate the free end of the third section and the adjacent end of the articulated boom which is pivotally connected at either end of the link means to the third section and articulated boom. The pivotal connection of the link means with the articulated boom is normally locked so that they lie in the same plan and pivot as one unit about the pivotal connection of the link means with the third section. When the articulated boom and link means is effectively perpendicular of the main boom, by disconnecting the lock means, the articulated boom is permitted to pivot about its connection with the link means when the latter is in its perpendicular condition so that the articulated boom can fall back over the retracted first, second and third booms whilst preserving the integrity of the conveyer run without dismantlement.

Although any suitable means, such as hydraulic cylinders, can be used in order to cause telescopic displacement of the main boom, in accordance with another embodiment of my invention, I prefer to use cable loop assemblies functioning on the main boom sections in a manner similar to that used on extension ladders. In this regard, a first cable loop and pulley means is arranged along the first boom section and a second cable loop and pullery means arranged along the second boom section. The first cable loop is fixedly connected to the second section. One run of the second cable loop is fixedly connected to the third boom section and its other or opposite run is fixedly connected to the first boom section. As the first cable loop is caused to rotate about the two pulleys on the first boom section due to external means driving this loop, due to the connection of this loop with the second section, the latter is constrained to move in the same direction as the loop run of the first cable loop to which it is connected. Because the second cable loop carried by the second section is connected on its opposite runs to the first section and the third section and because the second section is telescopically displaced as a result of the first cable loop rotating about its pulleys on the first section, the third section telescopes in unison or concert with the telescoping of the second section from the first section.

In another embodiment of my invention, a unique mechanical arrangement is employed as the main boom support and telescopic displacement control means and which enables telescopic displacement of the main boom to take place along a predetermined angle without any interaction by the first hoist means. The primary function of the first hoist means is merely to cause raising and lowering of the main boom. This mechanical arrangement may, for example, involve a first cable length extending from the first hoist means and which terminates at a first block (pulley) located intermediate the hoist means and the free end of first section. A second cable length, one end of which is connected to the free end of the first section and the other end of which terminates at a second block intermediate the first block and the free end of the second section is carried by and extends through the first block. A third cable length, at one end, is connected to the free end of the first section during its "upper" run about opposed pulleys on the second section, opposed pulleys on the third section and then to the second block from whence it is returned during its "lower" run to a pulley on the free end of the second section, about another pulley on the opposite end of this section and then terminates on the free end of the first section adjacent the other cable terminal end.

This block and third cable arrangement, for any given degree of angulation of the main boom as determined by actuating the first hoist means, provides even support for the main boom at that or any other angle whilst, at the same time, the main boom sections may be telescoping in the manner discussed above since the arrangement of blocks (pulleys) effectively makes provision for surplus cable take-up or let-out without the necessity of take-up or let out at the first hoist means.

In accordance with another embodiment of my invention, the articulated boom support and telescopic displacement control means, as above mentioned, may comprise a second hoist means and fourth cable and fixed pulley control means which extends from said base to the free end of the first section. In this arrangement, the fourth cable is carried between these two points by fixed pulleys on the articulated boom, on opposite ends of the third section and on opposite ends of said second section. Accordingly, as the boom extends or retracts, for a given main boom angulation, the cable and fixed pulley control means enables the articulated boom, whilst in a supported condition, to move with the telescopic main boom without variation in its own angulation and without operation of the second hoist means. Angulation of the articulated boom relative to the main boom is of course achieved by actuation of the second hoist means.

Since the free end of the articulated boom, relative to the base, may be at a smaller angle to horizontal than the angle of the main boom, in order to support the former, a mast can be pivotally connected to the articulated boom proximate the pivotal connection of the articulated boom with the third section. In this construction, the mast is constrained for pivotal movement by means which interconnects the upper limit of said mast to the free end of the articulated boom and which also imparts additional support to the free end of the articulated boom. Furthermore, at least one of the fixed pulley control means is similarly positioned on the upper limit of the mast.

In order to drive the conveyor belt, I prefer to locate the drive pulley therefor at the extreme end of the main boom or where an articulated boom is included, at the extreme end of the latter, or both. In order to further assist belt drive, the surplus belt return run take-up pulleys can themselves function as drive belt pulleys. Moreover, it will be appreciated that the upper run of the conveyer belt need not always run in an outward direction relative to the base. In situations where the belt is effectively running in reverse, the upper run return pulley located adjacent the base can in a like manner advantageously be used as a drive pulley.

Any suitable means for driving the endless belt, the first and second hoist and for causing telescopic displacement of the boom sections can be used although I prefer to drive all of these components by known hydraulic means.

In the accompanying drawings which illustrate primarily in schematic form one working embodiment of my invention:

BRIEF DESCRIPTION OF THE DRAWINGS

FIG. 3(a) is a partial side schematic view of the base and lower portion of the endless conveyor;

FIGS. 4(a) and 4(b) show, again in schematic form, the main boom support and telescopic displacement control means when in retracted and extended positions, respectively;

FIGS. 5(a) and 5(b), is similar to FIGS. 4(a) and 4(b), but illustrates the articulated boom support and telescopic support control means;

DETAILED DESCRIPTION OF DRAWINGS

Figure 1:
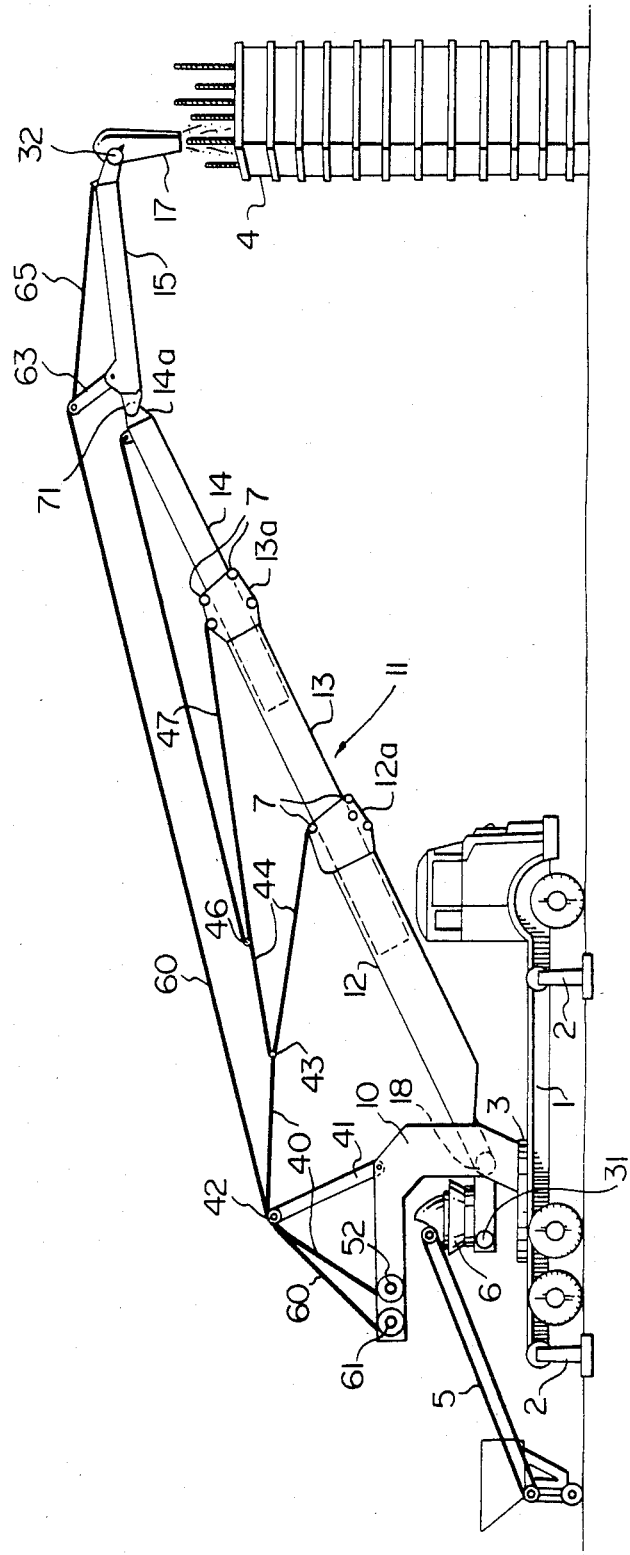
FIG. 1 is a side schematic view showing the conveyor apparatus vehicle mounted with the main boom extended.

A schematic of an operational conveyor and telescopic boom apparatus is illustrated in FIG. 1 in operational form. The overall device is shown mounted on road vehicle 1 which has laterally extending stabilizing supports 2. Base 10 is positioned on a rotatable platform generally indicated at 3. Pivotally connected to base 10 at pivot pont 18 is main boom 11 composed of first, second and third boom sections identified as 12, 13 and 14, respectivly. The free ends of sections 12, 13 and 14 terminate at head section 12(a), 13(a) and 14(a) as shown. Each boom section is box-like in cross-section and preferably constructed from metal caging for strength and lightness as is well known in the art. The sections are adapted to move telescopically within one another along ways, guides or rollers (not shown) as is also well known in the art. The free end of section 14 is pivotally connected to articulated boom 15 at 71 and at its other end, terminates at pour shroud 17 overlying pour site 4.

As illustrated, base 10 is associated with a material supply conveyor generally indicated at 5 which itself may be portable as is well known in the art and which supplies material to charging hopper 6 overlying the main conveyor belt which is described in connection with FIGS. 3(a), 3(b) and 3(c).

As discussed in greater detail hereinbelow, main boom support and telescopic control means comprising a first cable length 40, second cable length 44 and third cable length 47 supports the main boom 11 from mast 41 and additionally permits sections 12, 13 and 14 to effect telescopic displacement without movement of cable 40. Cable 40 itself is supported on a pulley 42 and is wound about first hoist means 52 on base 10.

Also as discussed in greater detail hereinbelow, articulated boom support and telescopic displacement control means including a fourth cable length 60 extends from mast 41 to articulated boom mast 63 and as in the case with the main boom support, enables articulated boom 15 to maintain its angle during telescopic displacement of main boom 11 without movement of cable 60. Cable 60 terminates on base 10 at second hoist means 61 via pulley 42 which in fact is a series of pulleys arranged along the same horizontal axis (not shown). Mast 63 which is pivotally connected to articulated boom 15 is constained from counter-clockwise movement due to support cable 65 connecting the upper limit of the mast to the free end of boom 15 as illustrated.

It is to be understood from that which follows, that both the main and articulated boom support and telescopic displacement control means shown in right-hand view in all of the drawings is effectively twinned so that there is a left-hand duplicate of same i.e. on the left and right hand sides of the main and articulated boom, so that the endless belt conveyor overlying these booms and as described hereinafter, can follow its circuit therebetween unimpeded. For ease of understanding, however, only the right hand configuration is illustrated and discussed. In keeping with this, there would be allochiral masts 41 and 63 and winch means 52 and 61, for example.

Figure 2A:
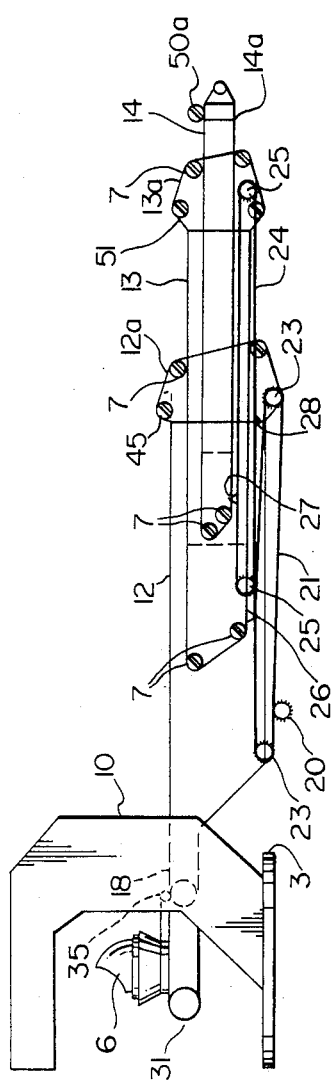
FIG. 2(a) is a side schematic view of the base and main boom in retracted condition and the means for causing the boom sections to telescopically displace.
Figure 2B:
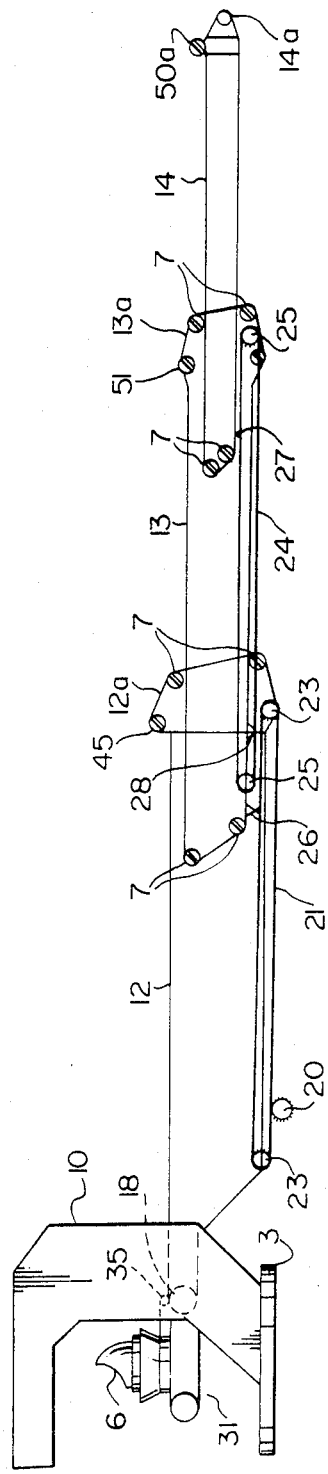
FIG. 2(b) is a similar view to FIG. 2(a), but where the boom sections are extended.

Referring now to FIGS. 2(a) and 2(b), the right hand means on the main boom for causing telescopic displacement of boom sections 12, 13 and 14 is shown. The articulated boom is not included in these drawings for ease of understanding. When it is attached to the free end of boom 14 it merely moves in accordance with the movement of section 14. On the lower length of boom 12, a first cable loop 21, preferably fabricated from a drive chain, is entrained about opposed pulleys or sprockets 23 for movement therearound. As shown, the lower run of chain 21 engages drive wheel or sprocket 20 which is operator controlled and driven either clockwise or anti-clockwise by any suitable means such as a hydraulic drive (not shown). The upper run of chain 21 is fixedly connected to the base end of section 13 at 26 so that it will move in or out relative to section 12 when loop 21 moves about sprockets 23.

A similar arrangement to that above described is positioned along the lower portion of section 13 and comprises a second cable loop or chain 24 and opposed pulleys or sprockets 25. Cable or chain loop 24, along its lower run, is fixedly connected to section 12 at point 28 and along its upper run to section 14 at point 27. Using the extension ladder principle, as loop 21 is caused to run by drive 20 and section 13 displaced outwardly, loop 24, due to its attachment to section 12, is also caused to run thereby moving section 14 outwardly due to its attachment to section 14. Retraction of this section is achieved by rotating drive 20 in the reverse (clockwise) direction as apparent when comparing FIGS. 2(a) and 2(b).

Extension telescopic boom rollers 7 located on booms 12, 13 and 14 together with complementary ways (not shown) facilitate free extension and retraction as well as a supporting connection between the booms as is known in the art.

Figure 3B:
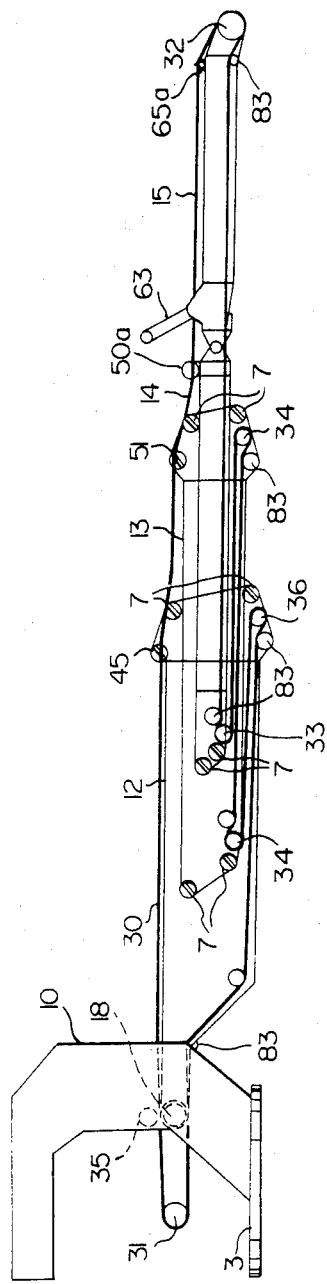
FIG. 3(b) in side schematic view illustrates the conveyor run on the main and articulated booms when the main boom is partially retracted.
Figure 3C:
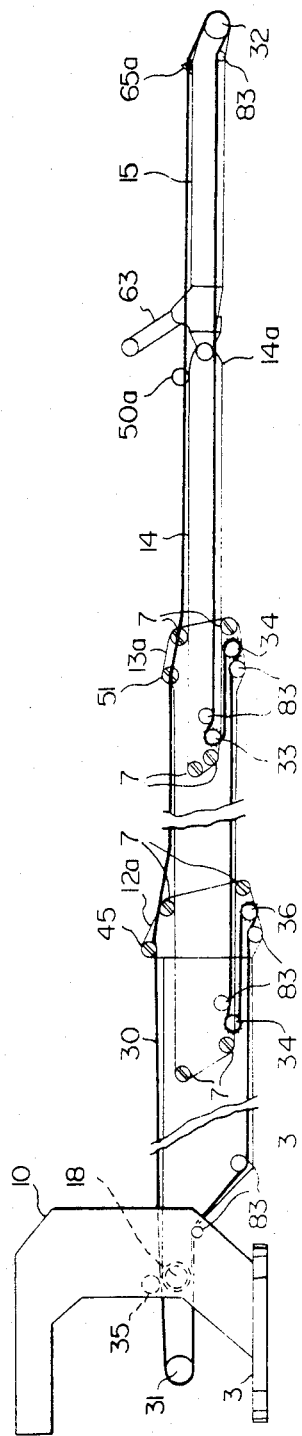
FIG. 3(c) is similar to FIG. 3(b) but where the main boom is in an extended condition.

The endless belt conveyor 30 is partially illustrated in FIG. 3(a), and is illustrated in FIGS. 3(b) and 3(c) when the main boom and associated articulated boom is in its retracted and extended positions. The upper run of belt 30 is located centrally of both the main boom and articulated boom and in the illustrated embodiment is entrained about return pulley or belt roller 31 which in this instance is inboard of base 10 relative to its pivotal connection 18 with section 12 at one extreme end and about articulated boom return belt roller 32 at the other end. Not illustrated in detail for ease of understanding, but well known in the art, between rollers 31 and 32, within the base and on the upper portions of sections 12, 13 and 14 as well as articulated boom 15 immediately below the upper run of belt 30 are angulated belt support side rollers or idlers generally indicated at 80 as well as companion traverse roller 81 which in addition to supporting the belt, impart sufficient rigidity to the latter for the transporting of material thereon. As best seen in the FIG. 3(a) schematic, hopper 6 overlies that portion of endless belt 30 for delivery to the upper surface thereof the material to be transported. Since that portion of conveyor 30 within the base 10 is horizontal and the remainder carried by boom sections 12, 13 etc. may pivot at 18 relative thereto, two or more co-axial hopper belt restraining rollers 35 are located on the base and rollingly engage the upper surface of the belt preferably adjacent either of its sides to maintain the run of the conveyor in the base horizontal regardless of boom angulation. By dispensing with the horizontal component within the base, if desired, the return belt roller on the base can advantageously be located co-axial with pivot 18 without the necessity for restraining rollers 35.

It will be apparent that the upper run of belt 30 overlies sections 13 and 14 when the main boom is retracted even though the belt is not necessarily supported by the idling rollers of these sections. As the boom extends and as best seen in FIG. 3(c), the belt would be supported by the idler rollers carried on sections 13 and 14.

Because the conveyor belt is of a predetermined length, it is necessary to accommodate surplus belt length during telescopic displacement of the boom. This is carried out by fixed belt take-up means which as illustrated, comprises a stationary take-up roller 33 on section 14, opposed stationary take-up rollers 34 on the second section 13 and a further take-up roller 36 near the free end of section 12. Idler or strategically located guide rollers 83 (not all being shown) can be located along the main boom and articulated boom for the purpose of supporting in contact rolling engagement the belt during its return run between rollers 31 and 32.

While the upper run of belt 30 is primarily intended to move outwardly relative to the base, it will be appreciated that its direction of run can be reversed. In order to drive the belt, one or both rollers 31 and 32 can be used as drive rollers driven in any conventional manner and preferably, by hydraulic means. Optionally, rollers 33, 34 and 36 may similarly be employed as drive rollers in order to reduce the likelihood of belt slippage. It will also be apparent that any one or combination of rollers 33, 34, 36 or 83 can be biased in a direction so as to impart tension to the belt in order to accommodate variances in the belt length due to stretch or loading in a known manner (not shown). Actual belt take-up during the return run as will be evident when comparing FIGS. 3(b) and 3(c) during variations in the boom length is accommodated between roller 36 and roller 34 near the base end of section 13 and roller 33 and roller 34 near the free end of section 13. The combined change in distance between these roller pairs is equal to the extent of telescopic displacement of the main boom which is carried out in the manner discussed above in connection with FIGS. 2(a) and 2(b).

The right hand main boom support and telescopic displacement control mean is illustrated schematically in FIGS. 4(a) and 4(b) when the main boom is retracted and extended. As shown, a first cable length 40 is connected to winch means 52 and overlies one run of multiple pulley 42 supported on mast 41 and terminates at block 43. A second cable length 44 is attached to head component 12(a) of section 12 at 45 and extends through block 43 to then terminate at second block 46.

A third cable length, 47, supported by block 46, for ease of understanding, can be said to have upper and lower runs. The terminal end of the upper run of cable 47 is fixedly secured to head component 12a at 48 and extends about take-up pulleys 49 and 49a on opposite ends of section 13 and then about pulleys 50 and 50a on opposite ends of section 14 to block 46. The lower run, commencing from block 46, extends to pulley 51 of head component 13a, then to pulley 49 and thereafter to 48 where it terminates adjacent the terminal end of the upper run of cable 47.

It will be evident that pulley 49 carrys both the upper and lower runs of cable 47. This is readily achieved by employing a multiple sheaved pulley with a common axis (not shown).

During telescopic displacement of the main boom, on the upper run of cable 47 as above described, the displacement between block 46 and pulley 50a is equal to the sum displaced between pulley 50 and pulley 49a and between pulley 49 and point 48. On the lower run of cable 47, the displacement between block 46 and pulley 51 is equal to the displacement between point 48 and pulley 49. Thus, the upper run effectively supports boom 14 whilst the lower run supports boom 13 and each run is capable of accommodating telescopic displacement.

Disregarding the articulated boom support and telescopic displacement control means discussed below, when the main boom is caused to telescope in the manner previously discussed in connection with FIGS. 2(a) and 2(b), and with reference to FIGS. 4(a) and 4(b), it will be seen that extension of the boom takes place without let-out of length 40 from hoist means 52. Indeed, boom extension or retraction take-up is performed by the third cable length 47. Accordingly, it will be apparent that the main boom can be extended or retracted without interplay of hoist 52 and further, when hoist 52 is actuated, the main boom can be raised or lowered about pivot point 18 as cable 40 is taken in or let out. It will also be appreciated that several functions can be performed at the same time e.g. with the conveyor belt 30 running, the boom can be hoisted and further, the main boom extended.

FIGS. 5(a) and 5(b) illustrate in schematic form the articulted boom support and telescopic displacement control means as used in accordance with one working embodiment of my invention. As before, only the right hand side is illustrated and it is understood that this arrangement can be duplicated on the left hand side of conveyor 30. A fourth cable length 60 extends from winch means 61 over multiple pulley guide 42 to the upper end of mast 63 which itself is pivotally connected to articulated boom 15 at point 64. An additional support cable 65 is fixed at either of its ends to the upper limit of mast 63 and the free end of boom 15 at point 65a so as to positively support the latter and constrain pivot movement of mast 63 in a counter-clockwise direction. All fixed idler pulleys 66 on mast 63 carry cable 60 which is then fed thrugh a return pulley 67 on the base end of section 14, opposed pulleys 68 on either end of section 13 in a back-and-forth arrangement as illustrated and finally terminating at 69 by being fixedly secured to the free end of section 12 at head component 12(a). Adverting to FIGS. 4a and 4b, pulley 49 was previously described as having multiple sheaves (two) for the upper and lower runs of cable 47. Pulley 68 of FIGS. 5(a) and 5(b) in fact can be co-axial with pulley 49 and indeed, included within this multiple pulley arrangement, so that there are three sheaves. In a like manner, it will be apparent that many of the pulleys and idlers illustrated in these figures can in fact comprise multiple sheaves carrying cable 47 and 60.

Additional tension or guide pulleys 70 may be strategically positioned along the second and third sections 13 and 14 as indicated. In this arrangement, the length of main boom and articulated boom extension or retraction corresponds to the change in the sum of the distance between cable length 60 from point 69 to pulley 68 on the base end of section 13 and from opposite pulley 68 to pulley 67 on section 14. Like the prior arrangements, articulated boom 15 can be fully supported by cable 60 when hoist 61 is inoperative and the boom is telescoping inwardly or outwardly by virtue of the above-described back-and-forth take-up arrangement.

In order to angulate boom 15 relative to main boom 11, hoist 61 can either take-up or let out cable length 60 thereby causing boom 15 to rotate about pivot point 71 connecting this boom to section 14. Furthermore, by rotating hoist 52 in a counter-clockwise direction to take in cable 40 and simultaneously rotating hoist 61 in a clockwise direction to let out cable 60, it is possible to raise the main boom while, at the same time, permit boom 15 to rotate about pivot 71 in a downward direction. This function can also be performed while the boom is telescoping, the endless belt is running and if desired, while base 10 is turning on turntable platform 3.

Figure 6A:
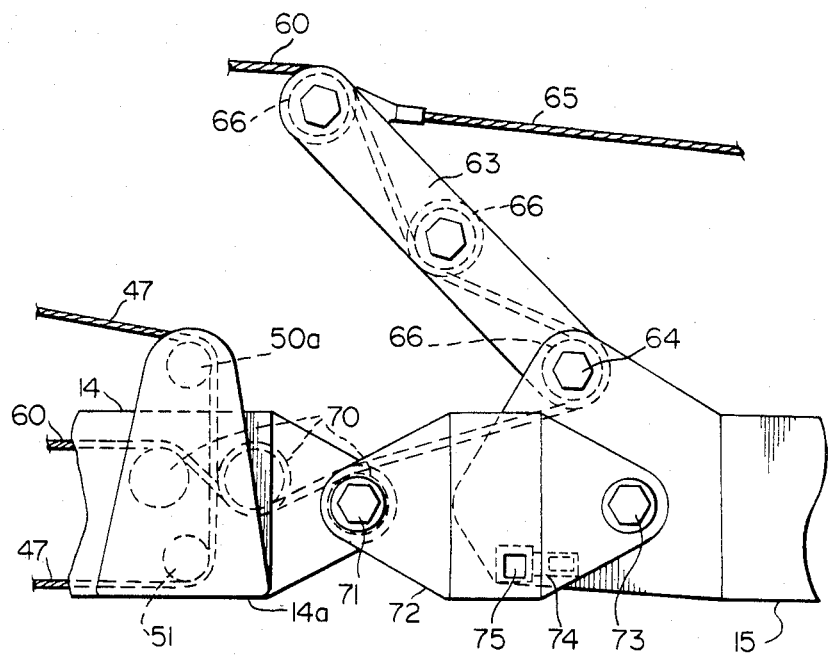
FIGS. 6(a) and 6(b) illustrate, in detail, the linkage means interconnecting the third boom section to the articulated boom when the latter is in a plane parallel to the main boom and when it overlies the former.
Figure 6B:
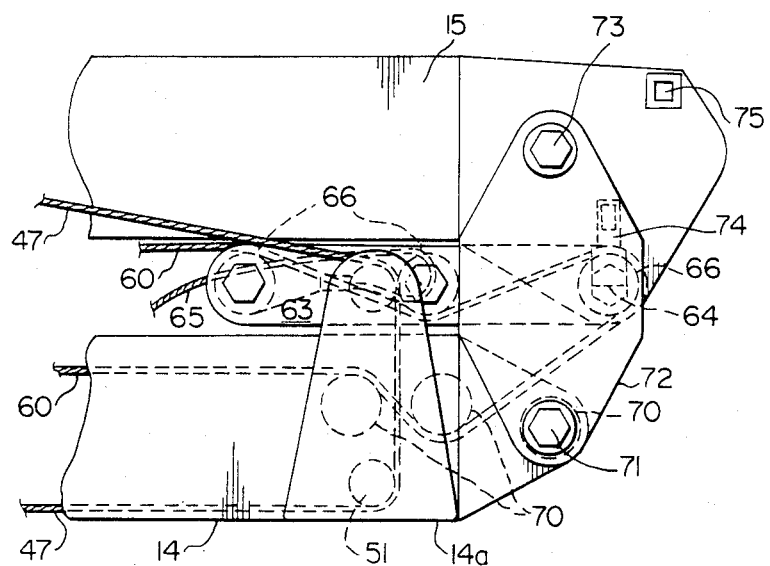

In FIGS. 6(a) and 6(b), the linkage means interconnecting section 14 to articulated boom 15 is illustrated. Link 72 is normally pivotally connected to the free end of head 14(a) at 71 which additionally supports pulley 70 and at its other end, is pivotally connected to boom 15 at 73. However, in its operative mode, this last mentioned pivot connection is left locked by virtue of locking means or latch 74 on link 72 which cooperatively engages slot 75 in order to retain link 72 and boom 15 in fixed relationship. Upon take-up or let-out of cable 60, both boom 15 and link 72 pivot as one unit about point 71 as they are locked together. In order to have boom 15 overlie at least section 14 and preferably sections 13 and 12 when they are in their retracted position boom 15 is first swung upwardly to a vertical position by virtue of pull on cable 60. Latch 74 is then disengaged from slot 75 thereby enabling boom 15 to rotate relative to link 72 about pivot point 73 so as to then position boom 15 over the main boom as best seen in FIG. 6(b).

In situations where the apparatus of my invention is used on a mobile vehicle, it is quite possible that the main boom and where an articulated boom is included, the articulated boom overlying the main boom, may extend a considerable extent beyond the frame of the vehicle. The overhanging boom portion in such situations can extend rearwardly of the vehicle and road supported by means of a trailer attachment as is well known in the art.

It is understood that the working arrangement above described is illustrative of one working embodiment of my invention and that various changes to the specific features disclosed can be made without departing from the spirit or scope of my invention.

I claim:

1. A telescopic boom and conveyor apparatus having a base component;
    a main boom comprising first, second, and third telescopic boom sections, one end of said first section being pivotally connected to said base component for vertical movement relative thereto, an articulated boom section pivotally connected to the free end of said third section, and articulated boom support and telescopic displacement control means, extending from a position above the pivotal connection of said base with said first section to said articulated boom, for maintaining said articulated boom at a predetermined angle during telescopic displacement of said main boom;
    cable means for causing telescopic displacement of said third section within said second section, uniformly with telescopic displacement of said second section within said first section between points of minimum and maximum boom extension;
    an endless conveyor belt carried by the upper surface of said main boom and wherein the upper run of said belt extends from proximate the pivotal connection of the first section with the base, to at least the free end of the third section and wherein said belt overlies said first, second, and third boom sections, and said articulated boom;
    means for driving said belt;
    means for supporting said belt during its upper and return runs;
    fixed belt take-up means on said first, second, and third boom sections co-operating with the return run of the belt for accomodating excess length in the return run of the belt at any given boom extension position;
    main boom support and telescopic displacement control means, extending from a point on said base component above its pivotal connection with said main boom to at least each of the ends of said first, second and third sections remote from said base, for maintaining said boom at a predetermined angle during telescopic displacement of said main boom;
    first hoist means on said base component, co-operating with said main boom support and telescopic displacement means, for raising and lowering said main boom; and
    second hoist means on said base component, co-operating with said articulated boom support and telescopic displacement control means, for angulating said articulated boom relative to said main boom.

2. The telescopic boom and conveyor apparatus as claimed in claim 1, wherein said base component is rotatable.

3. The telescopic boom and conveyor apparatus as claimed in claim 2 wherein said apparatus is vehicle mounted.

4. The telescopic boom and conveyor apparatus as claimed in claim 2 wherein the pivotal connection of said articulated boom to said third section comprises connecting link means intermediate said third section and said articulated boom and which is pivotally connected at either end to said third section and said articulated boom, and locking means for fixedly securing the pivotal connection of said linking means with said articulated boom.

5. The telescopic boom and conveyor apparatus as claimed in claim 1 wherein said means for causing telescopic displacement of said main boom sections includes a first cable loop and pulley means on said first boom section and wherein one run of said first cable is fixedly connected to said second section and a second cable loop and pulley means on said second boom section and wherein one run of the second cable loop is fixedly connected to said third boom section and the opposite run of said second cable loop is fixedly connected to said first boom section.

6. The telescopic boom and conveyor apparatus as claimed in claim 1, wherein said means for driving said belt includes a drive return pulley positioned on the free end of said third boom section.

7. The telescopic boom and conveyor apparatus as claimed in claim 5, wherein said means for driving said belt includes a drive return pulley positioned on the free end of said articulated boom.

8. The telescopic boom and conveyor apparatus as claimed in claim 7 wherein said main boom support and telescopic displacement control means includes a first cable length terminating at one end at a first block intermediate said hoist means and said first section; a second cable length one end of which is connected to the free end of the first boom and the other end of which terminates at a second block intermediate said first block and the free end of said second section and wherein said second cable length extends through said first block; a third cable length both ends of which are connected to the free end of said first section and wherein said third cable length extends through said second block and through third cable fixed pulley take-up means on opposite ends of said third and second sections.

9. The telescopic boom and conveyor apparatus as claimed in claim 8, wherein said articulated boom support and telescopic displacement control means includes a fourth cable length extending from said base to the free end of said first section and wherein said fourth cable length extends through at least two fixed pulley on said articulated boom and through fourth cable fixed pulley take-up means on opposite ends of said third section and on opposite ends of said second section.

10. The telescopic boom and conveyor apparatus as claimed in claim 9 wherein said fixed belt guide means includes conveyor belt return take-up pulleys on the base end of said third section, on the opposite ends of said second section and on opposite ends of said first section.

11. The telescopic boom and conveyer apparatus as claimed in claim 10, wherein said means for driving said belt further includes at least one additional drive pulley selected from the group consisting of said conveyor belt return take-up pulleys.

12. The telescopic boom and conveyer apparatus as claimed in claim 9 wherein said articulated boom includes a mast pivotally connected to said articulated boom proximate the pivotal connection of said articulated boom with the free end of said third boom section and wherein the pivotal movement of said mast is constrained by means interconnecting the upper limit of said mast to the free end of said articulated boom and wherein at least one of said fixed pulleys on said articulated boom is located on the upper limit of said mast.

13. The telescopic boom and conveyer apparatus as claimed in claim 3, wherein said articulated boom is adapted to overlie said first, second and third boom sections when said sections are in the minimum boom extension position.

14. The telescopic boom and conveyer apparatus as claimed in claim 1, wherein said boom sections are adapted to telescope at a predetermined angle when said first and second hoist means are inactive and said means for causing telescopic displacement is actuated.

15. The telescopic boom and conveyer apparatus as claimed in claim 1, wherein said first hoist means can be operated selectively concurrently with or independently of said second hoist means.

16. The telescopic boom and conveyer apparatus as claimed in claim 1, wherein said belt can be driven during telescopic displacement.

* * * * *